United States Patent [19]

Hirth

[11] Patent Number: 4,765,803
[45] Date of Patent: Aug. 23, 1988

[54] METHOD AND DEVICE FOR AGGLOMERATING ELECTRICALLY NONUNIFORMLY CHARGED-UP SOLID OR LIQUID PARTICLES SUSPENDED IN GAS STREAMS

[75] Inventor: Michael Hirth, Unterentfelden, Switzerland

[73] Assignee: BBC Brown, Boveri AG, Baden, Switzerland

[21] Appl. No.: 30,362

[22] Filed: Mar. 26, 1987

[30] Foreign Application Priority Data

Mar. 26, 1986 [CH] Switzerland .......................... 1211/86

[51] Int. Cl.⁴ ............................ B03C 3/41; B03C 3/66
[52] U.S. Cl. ............................................ 55/2; 55/123; 55/139; 55/152
[58] Field of Search ...................... 55/2, 123, 136, 152, 55/139

[56] References Cited

U.S. PATENT DOCUMENTS 2,758,666 8/1956 Prentiss ............................... 55/152 X
3,257,779 6/1966 Strubler ................................ 55/123
4,162,144 7/1979 Cheney ..................................... 55/5

FOREIGN PATENT DOCUMENTS 2646798 4/1978 Fed. Rep. of Germany .
144509 10/1980 German Democratic Rep. .
WO84/04052 10/1984 PCT Int'l Appl. .
235276 3/1945 Switzerland .
809397 2/1959 United Kingdom .
962653 10/1982 U.S.S.R. ................................. 55/152

Primary Examiner—Kathleen J. Prunner
Attorney, Agent, or Firm—Oblon, Fisher, Spivak, McClelland, & Maier

[57] ABSTRACT

Method and device for agglomerating particles of opposite electrical charge suspended in gas streams, in which two partial gas streams (3) are provided, in which the particles are alternatingly charged with positive and negative ions in a manner such that sequences of particle clouds (7, 8) with alternatingly positive and negative charge are generated locally, and that the two partial gas streams (3) are brought together in a manner such that the particle clouds (7, 8) of opposite charge impinge on each other and the particles of different sign conglomerate into larger particles. Two corona discharge devices consisting of a point (5) and plate (6) are fed by two transformers wired in opposite phase.

3 Claims, 2 Drawing Sheets

METHOD AND DEVICE FOR AGGLOMERATING ELECTRICALLY NONUNIFORMLY CHARGED-UP SOLID OR LIQUID PARTICLES SUSPENDED IN GAS STREAMS

BACKGROUND OF THE INVENTION

1. Field of the Invention

The invention is based on a method for agglomerating electrically nonuniformly charged-up particles of the class of methods for agglomerating solid or liquid particles of opposite charge suspended in gas streams and on a device for agglomerating particles of the genus of devices for agglomerating solid or liquid particles of opposite electrical charge suspended in gas streams.

2. Description of the Prior Art

In electrostatic dust filters particles are usually agglomerated by bringing together two streams of dust charged up and having different signs, the particles of opposite sign mutually attracting each other and conglomerating. As a rule, the particles are charged up by passing each dust stream separately through a device equipped with a corona discharge (cf., for example, East German Patent Specification No. 144,509).

In such devices, which consist of points and plates, some of the charged-up particles are always deposited on the plate, which is undesirable in view of the intended action in the present case. If the resistance of the particles is high, an insulating layer is built up on the plate within a few minutes. This charges itself up until partial discharges are produced within the layer. the partial discharges produce ions of opposite polarities to the point which may considerably reduce the charging-up of the dust particles.

From the prior art electostatic dust filters operated with alternating voltage are known. With such devices the reverse discharging, which inhibits the charging-up of the particles, can be largely suppressed (cf. Dr.-Ing. Dieter Klumpp, "Staubaufladung und -abscheidung in Wechselfeldern und der Rücksprühmechanismus in Elektrofiltern" ("Charging-up and deposition of dust in alternating fields and the reverse discharge mechanism in electrostatic filters"), Proceedings of the Institute for High-Voltage Technology and Electrical Installations, edited by Professor Dr.-Ing. H. Lau, University of Karlsruhe, No. 28).

SUMMARY OF THE INVENTION

In the present case, however, it is not a matter of depositing dust particles suspended in a gas stream on solid bodies, but of conglomerating them into larger agglomerates and in other respects leaving them in the gas stream.

According to the above there is therefore a need to refine and further develop the partial method into a successful and economic electrostatic dust removal system. The invention is based on the object of providing a method and also a device for agglomerating solid or liquid particles suspended in gas streams as economically as possible while preventing their deposition. The method and device should be simple, achieve a high yield and avoid expensive items of equipment and modes of operation. This object is achieved by the features specified in the following paragraphs.

A method for agglomerating solid or liquid particles of opposite charge suspended in gas streams is characterized in that two partial gas streams are provided in which the particles are charged by corona discharge with positive and negative ions in an alternating manner with respect to time in a manner such that sequences of alternatingly positive and negative particle clouds are formed locally, and that the two partial gas streams are brought together in a manner such that a positive particle cloud of one partial gas stream meets a negative particle cloud of the other partial gas stream simultaneously, the positive and negative particles combining and conglomerating into large particles.

The method is further characterized in that the corona discharge, which is alternatingly positive and negative with respect to time, is initiated in each case by a low-frequency alternating voltage acting on each partial gas stream, the voltages being shifted in phase with respect to each other in a manner such that, at the point where the two partial gas streams are brought together, a positive and a negative particle cloud on each occasion impinge on each other.

A device for agglomerating solid or liquid particles of opposite electrical charge suspended in gas streams is characterized in that two channels, each for a partial gas stream, converging on each other in a V shape and having a common exit channel are in each case provided with a corona discharge device consisting of points and plates for a low-frequency alternating voltage and two high-voltage transformers operating in opposite phase.

BRIEF DESCRIPTION OF THE DRAWINGS

The invention is described on the basis of the exemplary embodiment below which is explained in more detail by the figures.

In these.

DESCRIPTION OF THE PREFERRED EMBODIMENTS

Figure 1:
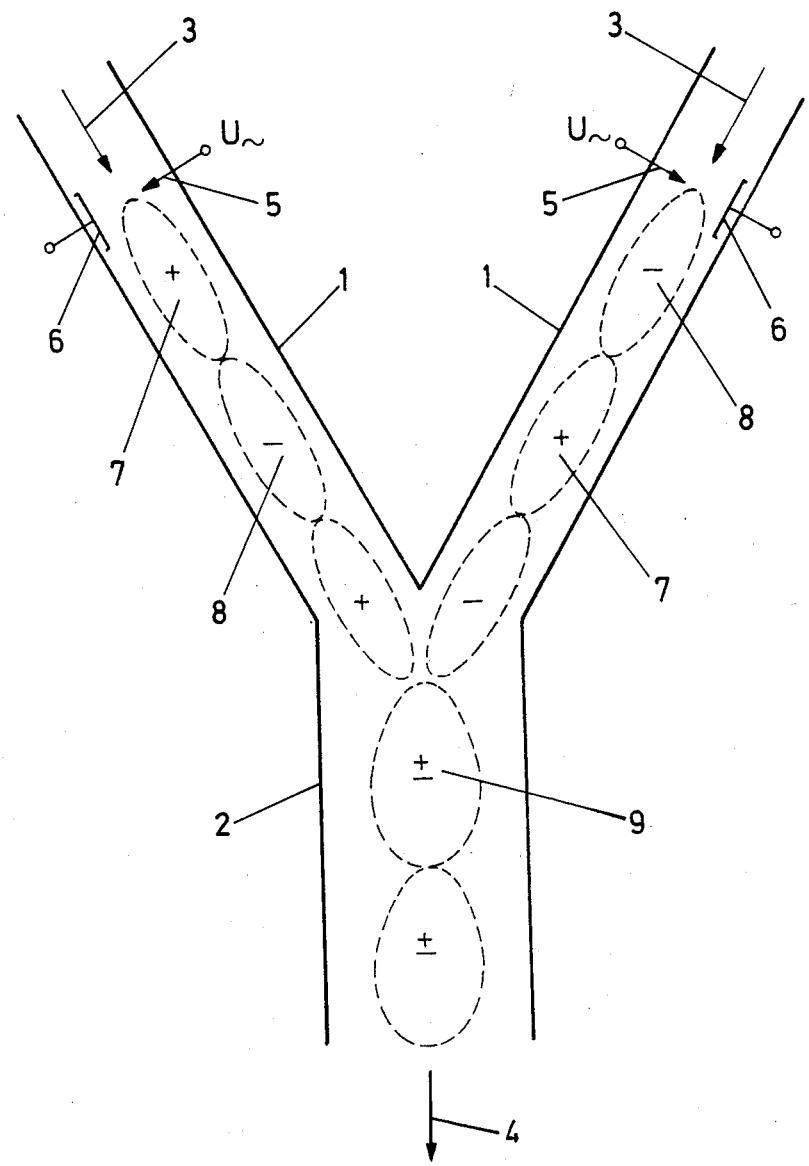
FIG. 1 shows the basic cycle of the method on the basis of a diagrammatically represented channel section.

FIG. 1 shows diagrammatically the principle of the cycle of the method for agglomerating particles in a gas stream. The total gas stream to be processed is divided up into two equal partial gas streams. Reference numeral 1 represents a channel for a partial gas stream, reference numeral 2 represents the channel for the total gas stream. Reference numeral 3 represents a partial gas stream loaded with particles before being electrostatically charged up. The total gas stream after the agglomeration carries the reference symbol 4. Reference numeral 5 represents a point constructed as a corona electrode, and reference numeral 6 represents the plate acting as counter electrode. Reference numeral 7 represents, in each case, a cloud of particles with positive charge, and numeral 8 represents, in each case, a cloud of particles with negative charge. As the gas stream advances clouds 7 and 8 alternate locally depending on the time-variable (usually sinusoidal) alternating voltage (high voltage) U~ applied to the electrodes 5 and 6. The phase relationship of the two voltages U~ affecting the partial gas streams 3 is so dimensioned that, allowing for the velocity of the gas and the geometrical dimensions of the channels 1 (in particular the length of the latter to the point where they join), a particle cloud with positive charge always meets one with a negative charge and vice versa. When they meet (indicated by the symbol ±), the neutral particle clouds 9 are formed which represent an agglomeration of the particles.

Figure 2:
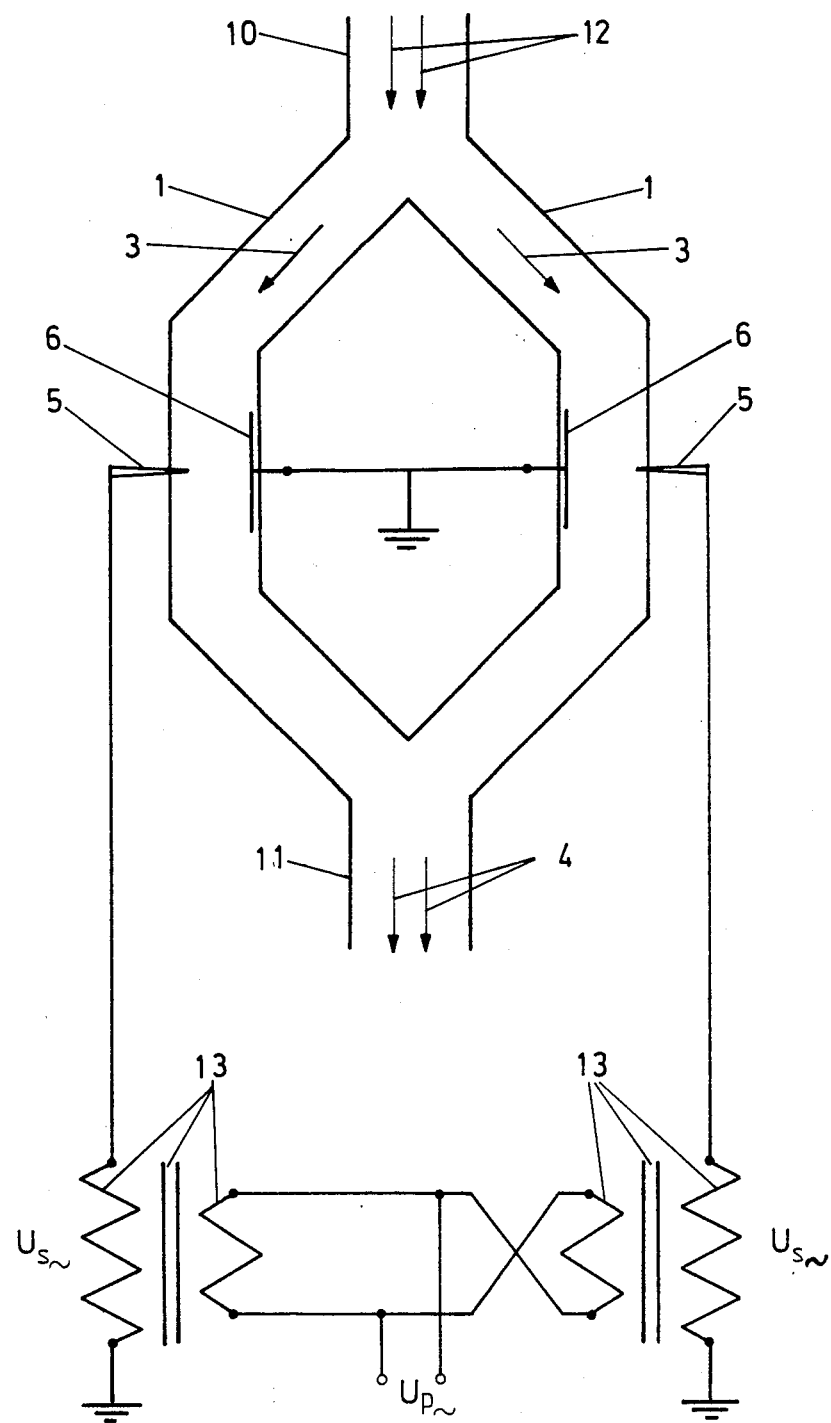
FIG. 2 shows the diagrammatic structure of a device for agglomerating particles.

FIG. 2 shows the structure of a device for performing the method according to FIG. 1 in a diagrammatic manner. The entry channel 10 carries the total gas stream 12 loaded with particles before agglomeration. The channel 10 branches into two channels 1 of equal size for the partial gas currents 3. The charging-up devices, which are provided with points 5 and plates 6 and employ the corona discharge, are connected to the secondary voltages $U_s\sim$, which are displaced in phase with respect to each other, of two high-voltage transformers 13 which are fed with the primary voltage $U_p\sim$. The total gas stream 4 loaded with particles leaves the system in the exit channel 11 after the agglomeration. In the present case, the channels 1 are of symmetrical and equally long construction and have a transverse dimension of approx. 50 mm. The velocity of the partial gas streams 3 is approx. 6 m/s. The voltage $U_s\sim$ is in this case approx. 20 kV. The primary coil of the second transformer 13 is cross-connected to the said voltage source $U_p\sim$ of 220 V/50 Hz with respect to that of the first transformer so that the corresponding electric field oscillates precisely in opposite phase to the first field.

The minimum mathematical relationship $$2f \cdot L = v$$

where
f = frequency·
L = axial length of the charging-up device in the direction of the gas stream, and
v = mean velocity of the gas stream,
yields the required frequency:

$$(1/f) \geq 2(L/V)$$

Exemplary embodiment

See FIG. 2. The system had an entry channel 10 of plexiglass with a square cross-section of 100 mm × 100 mm (inside dimensions). The channels 1 for the partial gas streams 3 each had a length of 750 mm in the flow direction and each had a cross-section of 100 mm × 30 mm. The discharge paths consisting of point 5 and plate 6 measured approx. 45 mm, the plate 6 having a length of 30 mm in the flow direction. The point 5 consisted of a stainless steel (V2A) and had a nose radius of 0.8 mm. The plate 6 consisted of aluminium. The gas stream 12 consisted of air in which 0.5 g/m³ of wax particles having a mean size of 4 m were suspended. The flow velocity of a partial gas stream 3 was approx. 6 m/s. The plates 6 were applied to earth potential, while the points 6 were each connected to the high-voltage pole of separate high-voltage transformer 13 ($U_s\sim$ =20 kV$_{rms}$) which were wired in opposite phase on the primary side. $U_p\sim$ =220 V$_{rms}$; f=50 Hz.

The measurements in the total gas flow 4 in the exit channel 11 revealed a high degree of agglomeration of the particles.

I claim:

1. A method for agglomeratig solid or liquid particles of opposite charge suspended in gas streams, characterized in that two partial gas streams are provided in which the particles are charged by corona discharge with positive and negative ions in an alternating manner with respect to time using two high-voltage transformers operating in opposite phase and fed with an AC primary voltage, the primary coil of one of said transformers being cross-connected to said primary voltage with respect to that of the primary coil of the other of said transformers and said primary voltage; said transformes providing a synchronism of polarity such that sequences of alternatingly positive and negative particle clouds are formed locally, and that the two partial gas streams are brought together in a manenr such that a positive particle cloud of one partial gas stream meets a negative particle cloud of the other partial gas stream simultaneously, the positive and negative particles combining and conglomerating into large particles.

2. A method according to claim 1, further characterized in that the corona discharge, which is alternatingly positive and negative with respect to time, is initiated in each case by a low-frequency alternating voltage acting on each partial gas stream, the voltages being shifted in phase with respect to each other in a manner such that, at the point where the two partial gas streams are brought together, a positive and a negative particle cloud on each occasion impinge on each other.

3. A device for agglomerating solid or liquid particles of opposite electrical charge suspended in gas streams, characterized in that two channels, each for a partial gas stream, converge on each other in a V shape, have a common exit channel and are in each case provided with a corona discharge device consisting of points and plates, said corona discharge devices being connected to an electrical circuit comprising an AC primary voltage source and two high-voltage transformers operating in opposite phase and connected to said primary voltage source, each of said corona discharge devices being connected to a different one of said transformers, the primary coil of one of said transformers being cross-connected to said primary voltage source with respect to the connection of the primary coil of the other of said transformers and said primary voltage source so as to provide a synchronism of polarity leading to neutralization of oppositely charged partial gas streams.

* * * * *